P. A. BONDESON.
BREAD AND TOAST CUTTING MACHINE.
APPLICATION FILED MAY 17, 1912.

1,082,926.    Patented Dec. 30, 1913.

WITNESSES:
L. C. Carlsen
E. C. Carlsen

INVENTOR:
Peter A. Bondeson,
BY HIS ATTORNEY:
A. M. Carlsen

UNITED STATES PATENT OFFICE.

PETER A. BONDESON, OF MINNEAPOLIS, MINNESOTA.

BREAD AND TOAST CUTTING MACHINE.

1,082,926.  Specification of Letters Patent.  Patented Dec. 30, 1913.

Application filed May 17, 1912. Serial No. 698,073.

*To all whom it may concern:*

Be it known that I, PETER A. BONDESON, a subject of the King of Sweden, who have declared my intention to become a citizen of the United States, residing at Minneapolis, in the county of Hennepin and State of Minnesota, have invented a new and useful Bread and Toast Cutting Machine, of which the following is a specification.
My invention relates to devices for cutting bread loaves into slices either for the table or preparatory to further baking the slices into toasts or rusks. The use of the latter form of bread being of late fast increasing, the invention will save much time in bakeries where great quantities of toasts are turned out; but the device will also save time in the slicing of bread in hotels, restaurants and large boarding houses and any other place where a great quantity of bread is to be cut into slices.

The object of the invention is to provide a machine of said kind which will cut bread into slices very rapidly, and which may be operated by either hand-power or motive power where the latter is obtainable.

Figure 1:
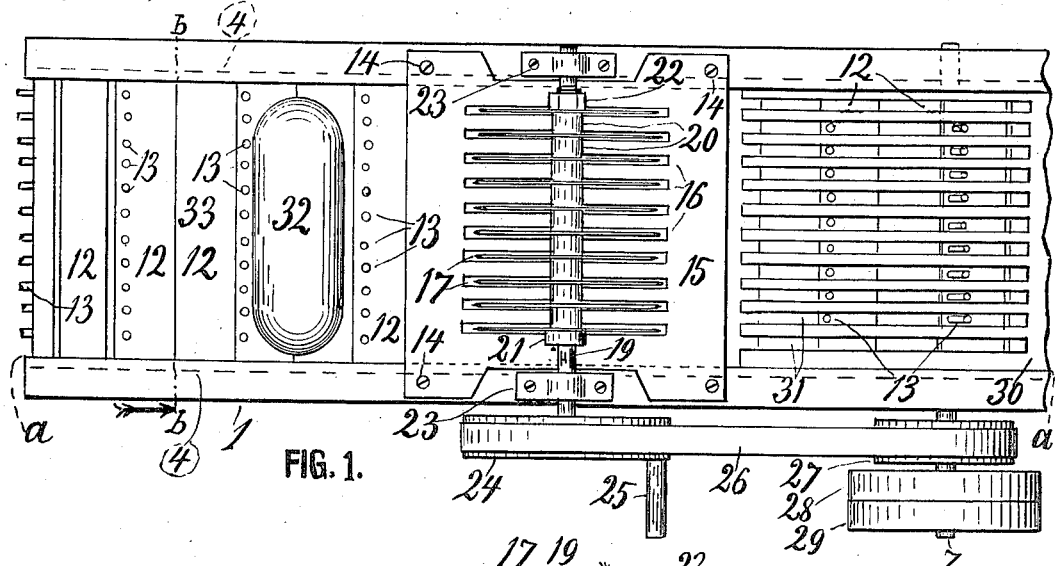
Figure 2:
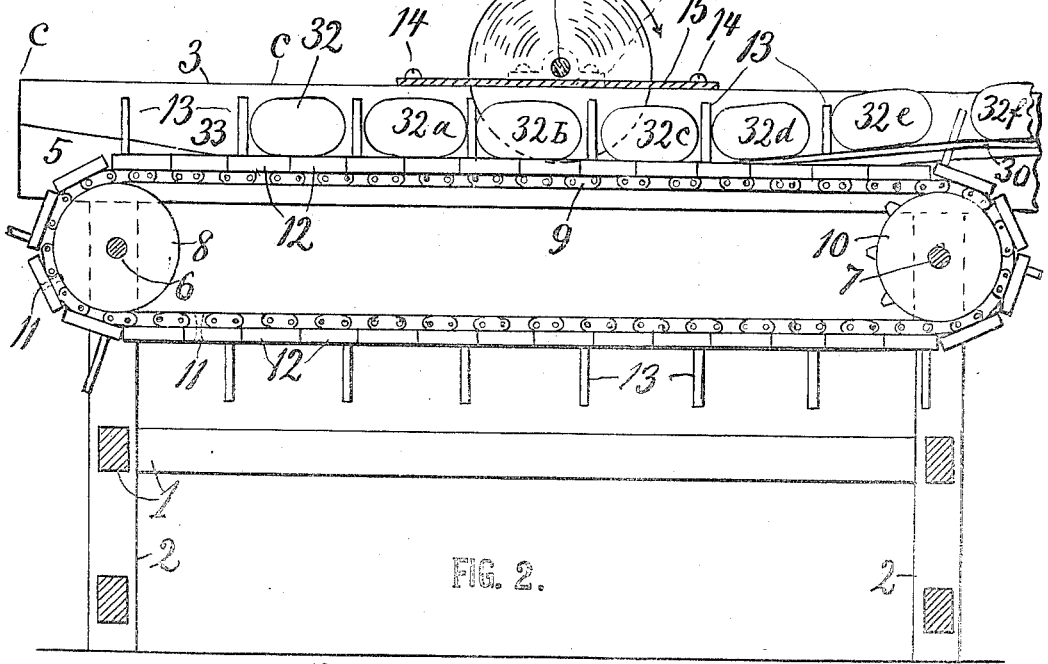
Figures 3, 4, 5:
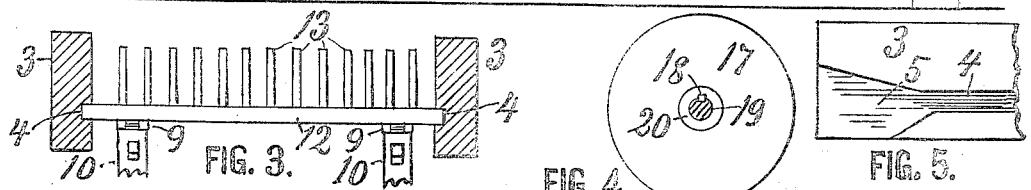

In the accompanying drawing Figure 1 is a top or plan view of my toast cutting and bread slicing machine with only one bread loaf shown upon it. Fig. 2 is a sectional side elevation of the machine on the line *a—a* Fig. 1 with several bread loaves on it. Fig. 3 is a cross section on the line *b—b* Fig. 1 of the upper part of the machine. Fig. 4 is a cross section of the cutter shaft 19 with one cutter disk and one collar shown as keyed thereon. Fig. 5 is an inside elevation of the side portion *c—c* of the frame of the machine, and shows the arrangement of the side grooves and their terminals in all the four corners of the frame.

Referring to the drawing by reference numerals, the frame 1 rests on four legs 2, and is formed with two parallel horizontal side pieces 3, each of which is provided with a horizontal groove 4, widened at the ends, as shown at 5 in Figs. 2 and 5.

Near each end of the frame is journaled two shafts, 6 and 7. On, or with, the shaft 6 rotate two pulleys 8, which guide and stretch two endless chains 9; said chains are driven by two sprocket-wheels 10, which are fixed on the shaft 7. Secured to said chains, or link-belts, by rivets 11 (shown in Fig. 2) are transverse flat cleats 12, whose ends are guided in grooves 4, as best shown in Fig. 3.

The endless carrier thus formed of chains and cleats or bars is provided with several transverse rows of fingers 13.

Across the top of the frame is secured at 14 a plate 15, having a series of parallel slits 16, in which are arranged to rotate a series of sharp-edged thin steel blades 17, which are of circular form and keyed at 18 on a shaft 19 and spaced by collars 20, as shown in Figs. 4 and 1. All the cutter blades and the collars 20 are firmly clamped together between a collar 21 affixed on the shaft near one end of it, and a nut 22 threaded near the other end of it.
The shaft 19 is journaled in bearings 23 fixed on the frame, and is at one end provided with a fixed pulley 24 having a handle 25. From said pulley extends a belt 26, which engages a pulley 27 that is fixed on the shaft 7. On the latter shaft is also fixed a pulley 28 and a loose pulley 29 which are adapted to receive a belt (not shown) from any motor or driving machine, so that whenever power is obtainable a belt may be placed on said pulleys, and where no power is obtainable the machine may be operated by the handle 25 and belt 26.

In one end of the frame is fixed a table 30, having its inner edge thin, or wedge-shaped, and provided with slits 31 for the fingers 13 to pass through. Only a portion of this table is shown, but it may be long enough to hold almost any desired number of sliced loaves pushed upon it from the machine, until they can be removed therefrom.

In the operation, the shafts 7 and 19 are rotated by any of the means already described and the belt 26 uniting their pulleys. While the machine is running the bread loaves are placed upon the endless carrier between the rows of fingers 13, about where the loaf 32 is disposed in the drawing; and as fast as each loaf is drawn in under the plate 15, and along as indicated by loaves $32^a$, $32^b$, $32^c$, $32^d$, $32^e$ and $32^f$ in Fig. 2, the next loaf is placed upon the carrier, in the space 33 thereof, and so on. During the operation each loaf is held downward on the carrier by the plate 15, while the fingers 13 move it along against and between the cutter blades 17, which cut it into slices, and the sliced loaf is then pushed by the fingers up along the inclined portion of the table and onto the level portion of it, and after the fingers have passed in under the table the fingers coming after keep on moving the entire layer of bread onward upon the table 30. If but a small quantity of bread is to be cut, the machine may be stopped while the operator removes the sliced bread from the table; but if a great quantity is to be cut, one operator keeps on feeding the machine, and a second operator gathers the slices from the table onto plates or into pans, in which they are to be toasted in the baking oven.

What I claim is:

In a machine of the class described, the combination of a frame, an endless loaf carrier mounted in the frame, a rotary cutter having a series of circular cutting blades arranged to slice the loaves as they are carried past the cutter; a stripper arranged to prevent the sliced bread from sticking between the cutters, a horizontal storing table arranged to receive the sliced bread from the machine; said table having an upwardly inclined portion with a sharp edge arranged close to the endless carrier at a point lower than the main table, so as to guide the sliced bread upwardly and onto the main portion of the table; said inclined portion having also slits, and said carrier having bread-engaging fingers by which to move the loaves, said slits serving as clearings for the fingers to permit them to pass through and then underneath the inclined portion of the table, whereby the fingers are able to force the sliced bread away upon the storing table while they pass in a level plane in under it.

In testimony whereof I affix my signature, in presence of two witnesses.

PETER A. BONDESON.

Witnesses:
W. K. HICKS,
GEO. L. MERKEIT.